(12) United States Patent  
Rajendran et al.

(10) Patent No.: US 11,689,499 B2
(45) Date of Patent: *Jun. 27, 2023

(54) MANAGEMENT OF ENDPOINT ADDRESS DISCOVERY IN A SOFTWARE DEFINED NETWORKING ENVIRONMENT

(71) Applicant: VMware, Inc., Palo Alto, CA (US)

(72) Inventors: Parasuramji Rajendran, San Jose, CA (US); Rishi Kanth Alapati, Dublin, CA (US); Shireesh Kumar Singh, Sunnyvale, CA (US); Aditi Vutukuri, Milpitas, CA (US); Chidambareswaran Raman, Sunnyvale, CA (US); Margaret Angeline Petrus, San Jose, CA (US); Anuprem Chalvadi, Santa Clara, CA (US); Pallavi Moghe, Mountain View, CA (US); Weiming Xu, Palo Alto, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/466,165

(22) Filed: Sep. 3, 2021

(65) Prior Publication Data

US 2021/0400014 A1 Dec. 23, 2021

Related U.S. Application Data

(63) Continuation of application No. 16/804,638, filed on Feb. 28, 2020, now Pat. No. 11,115,379.

(Continued)

(51) Int. Cl.
*H04L 61/5014* (2022.01)
*H04L 61/103* (2022.01)
(Continued)

(52) U.S. Cl.
CPC ...... *H04L 61/5014* (2022.05); *G06F 9/45558* (2013.01); *H04L 45/02* (2013.01);
(Continued)

(58) Field of Classification Search
CPC . H04L 61/2015; H04L 61/103; H04L 45/745; H04L 45/64; H04L 45/02;
(Continued)

(56) References Cited

U.S. PATENT DOCUMENTS 10,193,749 B2 * 1/2019 Hira ................... H04L 61/2592
2009/0307371 A1 * 12/2009 Okazaki ............... H04L 61/103
709/233

(Continued)

FOREIGN PATENT DOCUMENTS

WO 2019100993 A1 5/2019

*Primary Examiner* — Michael A Keller

(57) ABSTRACT

Described herein are systems and methods to manage Internet Protocol (IP) address discovery in a software defined networking (SDN) environment. In one example, a manager may generate an IP address discovery configuration and pass the IP address discovery configuration to a controller. Once received, the controller may obtain a discovered list from a hypervisor of one or more IP addresses associated with one or more logical ports and update a realized list for the one or more logical ports based on the discovered list and the IP address discovery configuration.

20 Claims, 7 Drawing Sheets

Related U.S. Application Data

(60) Provisional application No. 62/812,158, filed on Feb. 28, 2019.

(51) Int. Cl.
*G06F 9/455* (2018.01)
*H04L 45/745* (2022.01)
*H04L 45/64* (2022.01)
*H04L 45/02* (2022.01)

(52) U.S. Cl.
CPC ............ *H04L 45/64* (2013.01); *H04L 45/745* (2013.01); *H04L 61/103* (2013.01); *G06F 2009/45595* (2013.01)

(58) Field of Classification Search
CPC ............ H04L 61/6022; G06F 9/45558; G06F 2009/45595
See application file for complete search history.

(56) References Cited

U.S. PATENT DOCUMENTS

| | | |
|---|---|---|
| 2013/0124721 A1 | 5/2013 | Prasadam et al. |
| 2014/0351477 A1 | 11/2014 | Lee et al. |
| 2018/0007005 A1* | 1/2018 | Chanda ............... H04L 63/0263 |
| 2019/0213349 A1* | 7/2019 | Luo .................... H04L 63/0227 |
| 2019/0245949 A1* | 8/2019 | Wang .................. H04L 41/0895 |
| 2019/0319848 A1* | 10/2019 | Johnsen ................. H04L 45/48 |

* cited by examiner

| LOGICAL PORT COLUMN 610 | IP ADDRESS COLUMN 620 | IP ADDRESS COLUMN 630 | IP ADDRESS COLUMN 640 |
|---|---|---|---|
| LOGICAL PORT 611 | IP ADDRESS 621 | IP ADDRESS 631 | IP ADDRESS 641 |
| LOGICAL PORT 611 | IP ADDRESS 622 | IP ADDRESS 632 | |
| LOGICAL PORT 611 | IP ADDRESS 623 | IP ADDRESS 633 | |

MANAGEMENT OF ENDPOINT ADDRESS DISCOVERY IN A SOFTWARE DEFINED NETWORKING ENVIRONMENT

RELATED APPLICATIONS

This application hereby claims the benefit of and priority to U.S. patent application Ser. No. 16/804,638, titled "MANAGEMENT OF ENDPOINT ADDRESS DISCOVERY IN A SOFTWARE DEFINED NETWORKING ENVIRONMENT," filed Feb. 28, 2020, and U.S. Provisional Patent Application No. 62/812,158, titled "TECHNIQUES AND METHODS OF DISCOVERING AND MANAGING ENDPOINT ADDRESSES IN A SDN ENVIRONMENT," filed Feb. 28, 2019, and which is hereby incorporated by reference in its entirety.

BACKGROUND

Software defined networks include logical entities that provide various networking operations for computing elements, such as virtual machines and containers. The networking operations may include routing operations, switching operations, firewall operations, or some other networking operations. To implement the networking operations, a networking controller may be required to distribute software defined networking configuration data to various computing elements that host the logical entities of the software defined networks. These computing elements may comprise host computing systems for virtual nodes, such as containers or virtual machines, may comprise routing or switching elements, or may comprise some other computing element.

In some implementations, as the number of logical devices and logical ports are increased, it can become difficult and cumbersome to manage address bindings for the various logical elements. In particular, administrators may encounter obstacles in efficiently and effectively managing the discovery of new internet protocol (IP) address bindings, blacklists, and addressing duplication across the software defined networking environment.

Overview

The technology disclosed herein manages Internet Protocol (IP) address discovery in a software defined networking (SDN) environment. In one implementation, a method includes, in a management plane of the SDN environment, generating an IP address discovery configuration and passing the IP address discovery configuration to the control plane. The method further includes, in the control plane, obtaining a discovered list from a hypervisor of one or more IP addresses associated with one or more logical ports and updating a realized list for the one or more logical ports based on the discovered list and the IP address discovery configuration.

In one implementation, the method may further comprise, in the hypervisor, discovering a first set of one or more IP addresses associated with the one or more logical ports based on data traffic for the one or more logical ports. Once discovered, the method further provides, in the hypervisor, aggregating the first set of one or more IP addresses into the discovered list for the one or more logical ports and passing the discovered list to the control plane.

DETAILED DESCRIPTION

Figure 1:
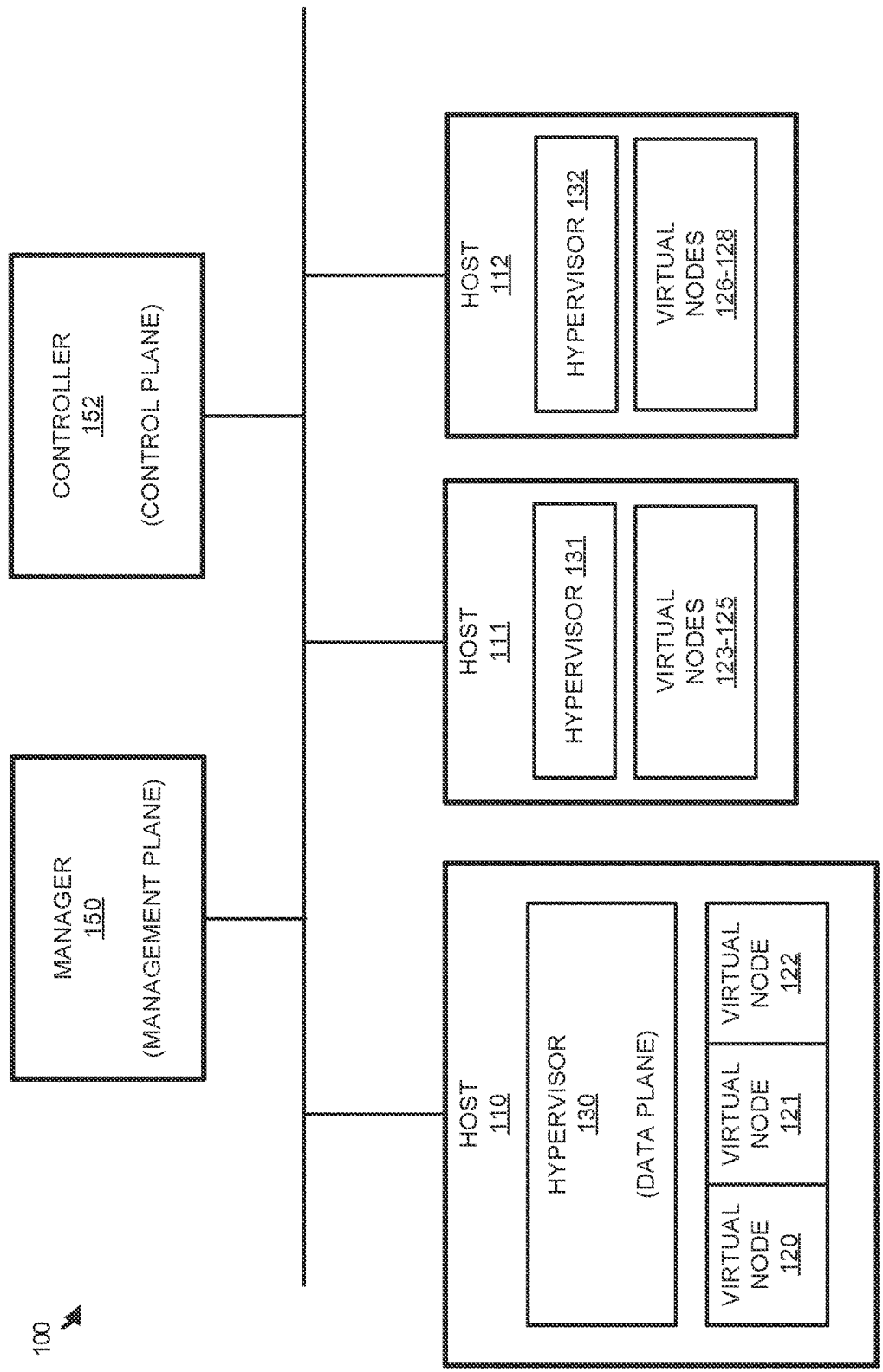
FIG. 1 illustrates a computing network to manage Internet Protocol (IP) address discovery in a software defined networking (SDN) environment according to an implementation.

FIG. 1 illustrates a computing network 100 to manage Internet Protocol (IP) address discovery in a software defined networking (SDN) environment according to an implementation. Computing network 100 includes manager 150, controller 152, and hosts 110-112. Hosts 110-112 further include hypervisors 130-132 and virtual nodes 120-128. Although demonstrated as a single element, it should be understood that controller 152 may operate as a distributed or clustered service in some examples. In one embodiment, controller 152 includes a local control plane that may execute at least partially on each of the hosts and may provide operations as part of hypervisors 130-132.

In operation, hypervisors 130-132 execute on hosts 110-112 to provide a platform for virtual nodes 120-128, wherein virtual nodes 120-128 may comprise virtual machines, containers, or some other virtualized endpoint. In at least one example, hypervisors 130-132 may be used to abstract the physical components of the corresponding hosts and provide virtualized components to the virtual nodes. The virtualized components may comprise processing resources, storage resources, memory resources, network resources, and the like. Here, in addition to providing a platform for the execution of virtual nodes, hypervisors 130-132 may further be used to provide software defined networking (SDN) operations for communications required by the virtual nodes. These SDN operations may include switching operations, firewall operations, routing operations, blacklisting operations, or some other operations.

In a software defined network (SDN) environment each virtual node of virtual nodes 120-128 may be coupled with a logical switch (also referred to as a data path set) that is decoupled from the underlying physical network. Each logical switch has a set of logical ports that can be coupled to a logical interface (e.g., a virtual network interface ("VNIC") of the virtual node). The logical port is an abstraction of a port of a logical switch that defines a set of data paths for an SDN (also referred to as a logical overlay network). Each logical port is mapped to a virtual port of a virtual switch provided by the hypervisor. The virtual switch operates as a physical Layer 2 switch within each of hypervisors 130-132. In addition to virtual switches (not shown), hypervisors 130-132 may include distributed logical routers, distributed firewall components, virtual tunnel endpoints, etc. for implementing and managing the software defined networks. The virtual switches of the hypervisors each have forwarding tables populated with forwarding table entries that collectively implement the logical switches. In some examples, address bindings may reside at the control plane, including the local control plane at each host, as well as forwarding tables associated with virtual switches, logical routers, tunnel endpoints, firewalls, etc. When a media access control (MAC) address, IP address, or virtual local area network (VLAN) identifier is bound to a particular logical port, it is also bound to the corresponding virtual port. Traffic addressed to a particular destination MAC, IP, and VLAN address tuple is directed by the virtual switch according to the forwarding table entries of the virtual switch and forwarding elements to the corresponding virtual port associated with the destination logical interface. The forwarding table entries may be used to permit a communication, block a communication, generate a log of the communication, or provide some other operation.

To configure the software defined networks in computing network 100, manager 150 and controller 152 are provided. Manager 150 may be used to provide a single point of configuration using one or more application programming interfaces (APIs). For example, an administrator associated with computing network 100 may generate a blacklist (using an API, web interface, or some other interface) that can prevent the use of IP addresses with one or more logical ports in computing network 100. Controller 152 is representative of a state management system that provides control plane functionality for routing and switching functions. Controller 152 may be used to obtain a configuration request from manager 150 and distribute information about the configuration to required hosts and hypervisors within computing network 100. Consequently, when an administrator generates a blacklist using manager 150, controller 152 may identify the request for the blacklist, identify hosts that are associated with the request, and forward a configuration update to the corresponding host or hosts. In forwarding and implementing the configuration, controller 152 may operate in the control plane that is used to determine what communication paths should be used for a packet when it is identified in a software defined network, whereas the data plane, implemented by hypervisors 130-132, forwards traffic based on the control plane logic.

In some implementations, manager 150 may be used to provide an IP address discovery configuration for the virtual nodes communicating in the data plane. The IP address discovery configuration may include manual bindings for a particular virtual node and logical interface, security controls, or some other configuration associated with the discovery of IP addresses for virtual nodes 120-128. In some examples, hypervisors 130-132 may be used to identify new IP addresses associated with the logical ports for virtual nodes 120-128, wherein the addresses may correspond to overlay network addresses for the virtual nodes, aggregate the newly discovered IP addresses, and provide the aggregated addresses to controller 152. Controller 152 may then update realized lists associated with logical ports for virtual nodes 120-128 based on the aggregated addresses from the hypervisors and the IP address discovery configuration supplied by manager 150.

Figure 2:
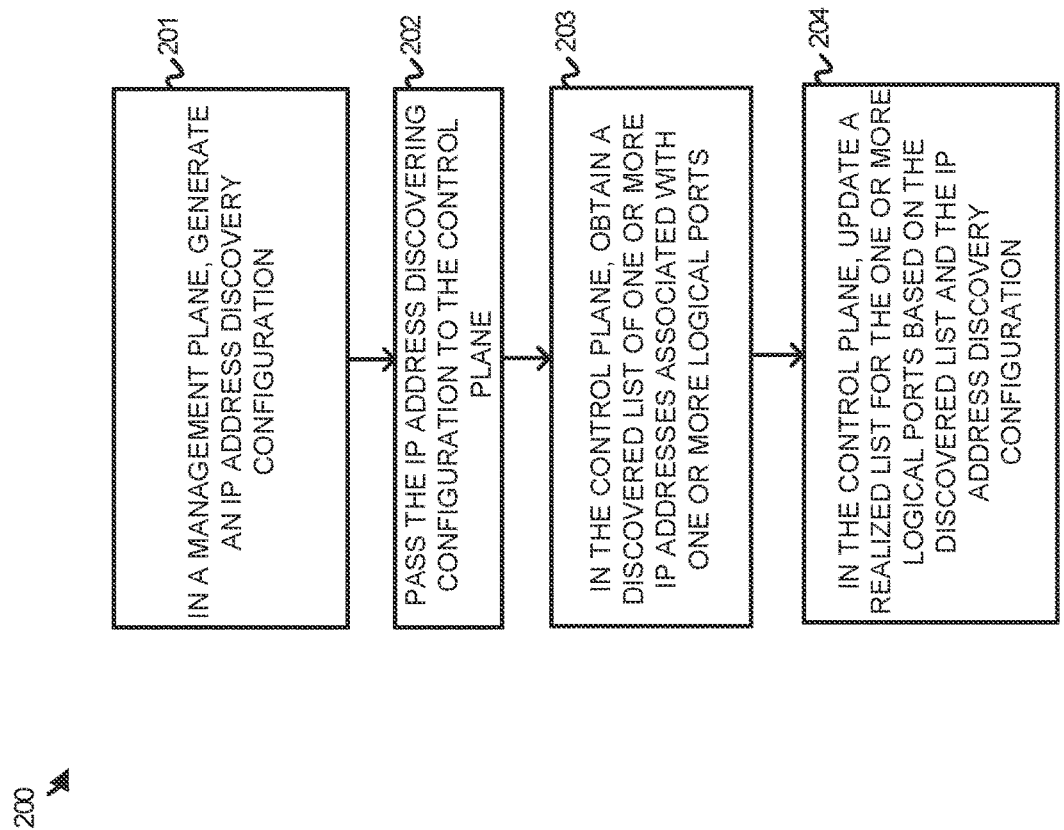
FIG. 2 illustrates a method of operating a computing network to manage IP address discovery in an SDN environment according to an implementation.

FIG. 2 illustrates a method 200 of operating a computing network to manage IP address discovery in an SDN environment according to an implementation. The steps of method 200 are referenced parenthetically in the paragraphs that follow with reference to systems and elements of computing network 100 of FIG. 1.

As depicted, method 200 includes, in a management plane of the SDN environment, generating (201) an IP address discovery configuration and passing (202) the IP address discovery configuration to the control plane. In some implementations, the IP address discovery configuration may indicate security controls or parameters, wherein the security controls may be used to restrict and limit the IP addresses that are available to each of the logical ports and corresponding virtual nodes in the SDN environment. The IP address discovery configuration may define whether the computing network should use Trust on Every Use (TOEU) that will update the discovered addresses for a port when a new IP address is used by the interface in sending traffic or whether the computing network should use Trust on First Use (TOFU) that will remember the discovered address when it is first used by an interface in sending traffic and remember the address throughout the lifetime of the interface. The security controls may also define timers or binding limits that could limit the number of IP addresses that are bound to the logical ports in the SDN environment. For example, an IP address discovery configuration generated by manager 150 may limit each of the logical ports to two IP addresses and configure the SDN environment to use TOFU. In some implementations, the IP address discovery configuration may further include manual bindings that are used to define one or more IP addresses to be associated with particular logical ports. These manual bindings may be used to take precedence over other discovered IP addresses associated with the logical port. Consequently, if a first IP address were manually assigned to a virtual node coupled to a first logical port and a binding restriction of one address were created for the first logical port, then any future identified IP addresses may be prevented from being bound to the first logical port.

In some implementations, controller 152 may maintain one or more realized lists or a collection of approved IP address bindings associated with the logical ports in the SDN environment. As a result, when the IP address discovery configuration is supplied from manager 150, controller 152 may update the realized list or lists associated with the relevant logical ports based on the provided configuration. This update may include adding IP address bindings corresponding to manual bindings, removing IP address bindings that are no longer permitted based on the IP address discovery configuration, or providing some other operation. Further, the controller may also be used to provide information to the hypervisor indicating new manual bindings to the logical ports, removing bindings from one or more discovered lists in the hypervisors, or providing some other operation.

Once the IP address discovery configuration is obtained, the method further includes, in the control plane, obtaining (203) a discovered list from a hypervisor of one or more IP addresses associated with one or more logical ports, wherein the discovered list comprises an aggregated address list from two or more sources. In some implementations, each hypervisor of hypervisors 130-132 may discover new IP addresses associated with logical ports using multiple sources, wherein the IP addresses correspond to overlay IP addresses for virtual nodes coupled to the logical ports. These sources may include various protocols identified in the data traffic for the SDN environment, wherein the protocols may comprise Address Resolution Protocol (ARP), Dynamic Host Configuration Protocol (DHCP), Neighbor Discovery Protocol, or some IP discovery protocol. The protocols may comprise both IPv4 and IPv6 that are used by the virtual nodes at the data plane level in the SDN environment. Additionally, the sources for the discovered list may comprise one or more agents executing locally within a subset of virtual nodes 120-128 to determine IP addresses allocated to the subset of virtual nodes. The information from the agents may be provided periodically, based on a request from the particular hypervisor, or at some other interval. For example, hypervisor 130 may obtain a report from an agent in virtual node 120 indicating one or more IP addresses allocated to virtual node 120. After monitoring the traffic associated with the logical ports and virtual nodes and/or communicating with agents in the virtual nodes, the hypervisor may aggregate the identified IP addresses for the logical nodes and provide the identified IP addresses as a discovered list to controller 152.

After obtaining the discovered list from the hypervisor, the control plane updates (204) one or more realized lists for the one or more logical ports based on the discovered list and the IP address discovery configuration. As described herein, the IP address discovery configuration may be used to limit the IP address bindings that are permitted for a particular logical port, wherein the limits may be based on a maximum value defined by an administrator, a timer for to binding to be associated with a logical port, a configuration of TOFU or TOEU, or some other configuration. Thus, if four IP addresses were identified in association with a particular logical port, but only three addresses are permitted for the logical port, then the IP address discovery configuration may be used to select three of the four IP addresses for the realized list associated with the logical port. These addresses may comprise the three most recently identified addresses, the three oldest addresses, or some other selection of addresses.

In some examples, in addition to using the IP address discovery configuration to determine how discovered addresses should be added to realized address lists for the SDN environment, controller 152 may further update the realized lists based on blacklists or duplicate address lists. The blacklists may indicate bindings that are not permitted in association with one or more logical ports. For example, a blacklist entry may indicate that a first IP address is not permitted to be bound to any logical port in the SDN environment. Accordingly, if a discovered IP address for a logical port corresponds to the first IP address, then controller 152 may prevent the address from being added to the realized list. This may prevent other services, such as firewalls, from identifying the first address as associated with an unapproved virtual node. In addition to the blacklists, controller 152 may further maintain one or more duplicate address lists that indicate IP address bound to the other logical ports in the SDN environment. As a result, if a discovered list from hypervisor 130 includes an IP address allocated to another logical port in the SDN environment, then controller 152 may prevent the IP address from joining the realized list or prevent the IP address from joining the realized list until the IP address is removed from the other realized list.

In some implementations, as the one or more realized lists are updated, controller 152 may distribute the one or more realized lists to other services provided in the SDN. The other services may comprise firewall services, spoof management services, ARP suppression, or some other service.

Figure 3:
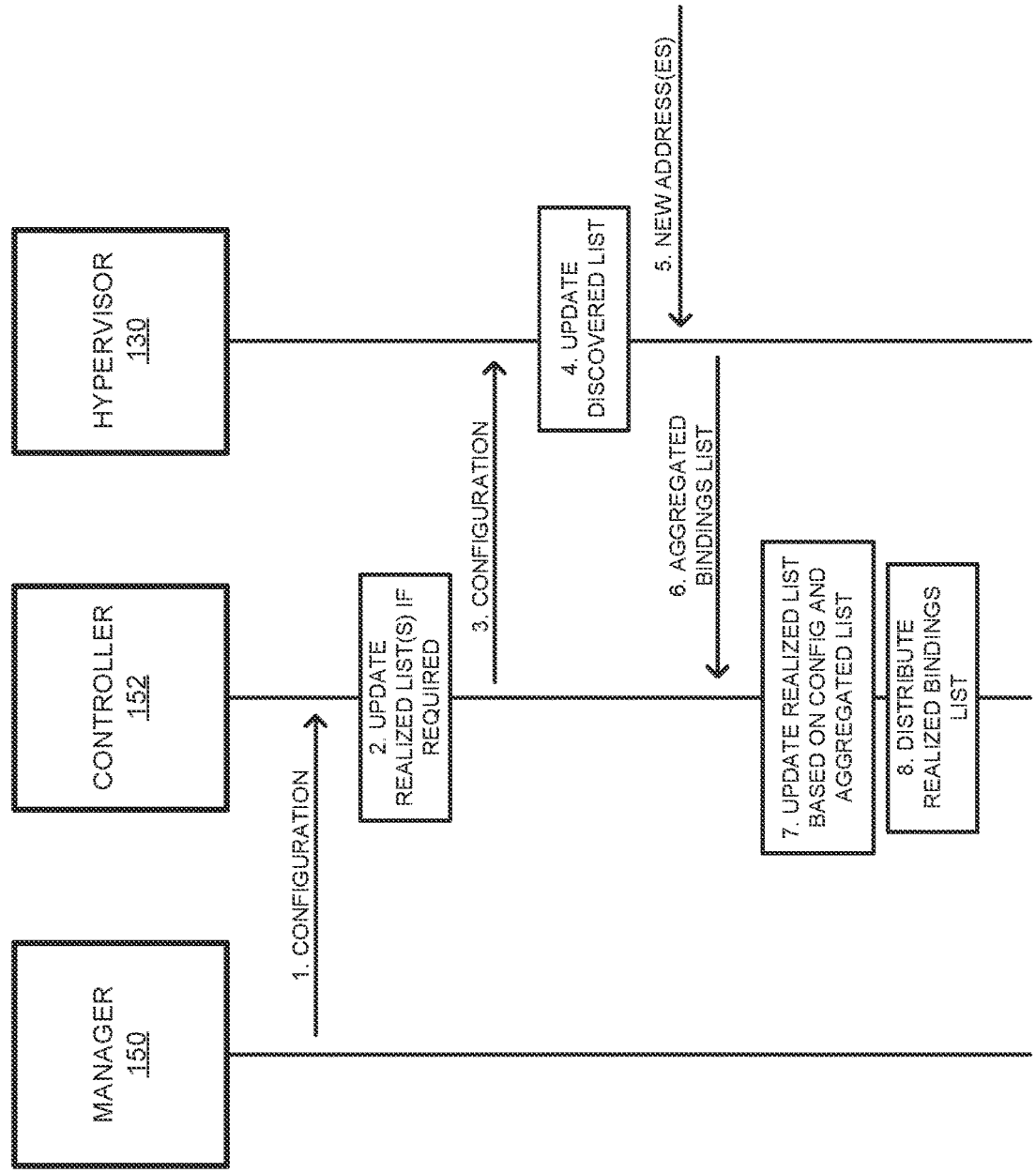
FIG. 3 illustrates a timing diagram of managing IP address discovery in an SDN environment according to an implementation.

FIG. 3 illustrates a timing diagram 300 of managing IP address discovery in an SDN environment according to an implementation. Timing diagram 300 includes manager 150, controller 152, and hypervisor 130 from computing network 100 of FIG. 1. Although demonstrated using hypervisor 130, it should be understood that similar operations may be employed by hypervisors 131-132.

As depicted, manager 150 may generate and communicate, at step 1, an IP address discovery configuration to controller 152. In response to receiving the configuration, controller 152 may update, at step 2, one or more realized lists associated with logical ports provided as part of an SDN environment, wherein the logical ports may be mapped to one or more VNICs associated with virtual nodes. The IP address discovery configuration may include parameters that indicate whether IP address discovery should use TOEU or TOFU, any binding limits associated with the logical ports, any manual bindings, or some other parameters. Consequently, when the configuration is received, controller 152 may be required to add one or more bindings to one or more realized lists, remove one or more bindings from one or more realized lists, or provide some other update to the realized lists.

In addition to implementing updates to the realized list based on the discovery configuration, controller 152 may further provide information about the configuration to hypervisor 130, at step 3. This update may permit hypervisor 130 to update, at step 4, a local discovered list for one or more logical ports. For example, hypervisor 130 may update a discovered list to add or remove addresses based on manual bindings generated for the configuration. In some implementations, controller 152 may determine one or more relevant hypervisors associated with the configuration and provide required configuration information to each of the relevant hypervisors, wherein the configuration may include bindings that should be added or removed from the discovered list or lists associated with the hypervisor.

Once the configuration is provided to controller 152 and, in some examples, any new binding information is provided to hypervisor 130, hypervisor 130 may identify a new IP address associated with a logical port, at step 5, and provide, at step 6, the new IP address as part of an aggregated discovered list to controller 152. In discovering the new IP address, hypervisor 130 may use multiple sources to identify overlay network addresses associated with the various virtual nodes, wherein the sources may comprise communication protocols identified in the data traffic or agents operating within the virtual node associated with the new address. In the example of protocols, the protocols may include IPv4 protocols and IPv6 protocols, wherein the protocols may comprise ARP, DHCP, Neighbor Discovery Protocol, or some other address discovery. Additionally, hypervisor 130 may receive notifications from agents operating in the virtual nodes on the host to determine IP addresses associated with particular virtual nodes and corresponding logical ports. Once the addresses are discovered using the different sources, hypervisor 130 may aggregate the various addresses and provide the addresses as a discovered list to controller 152. The addresses may be provided as they are discovered, periodically, at the request of controller 152, or at some other interval.

Once a discovered list is provided to controller 152, controller 152 may update, at step 7, one or more realized bindings lists associated with one or more logical ports based on the aggregated discovered list and the IP address discovery configuration. In updating the realized list or lists, controller 152 may add one or more IP addresses, remove one or more IP addresses, or provide some other operation with respect to an address. For example, for the new address identified by hypervisor 130, controller 152 may determine whether the address is permitted to be added to the realized list based on the limitations associated with IP address discovery configuration. Thus, if a bindings limit were associated with logical port on which the new IP address were discovered, controller 152 may determine whether the bindings limit is exceeded and only enter the newly discovered IP address when the limit is not exceeded. Once the one or more bindings lists are updated based on the received aggregated list and the IP address discovery configuration, controller 152 may distribute the realized lists to one or more services, such as firewall and ARP suppression services.

In some implementations, in addition to the IP address discovery configuration, controller 152 may further determine how to update realized lists for the logical ports based on blacklists and duplicate address lists for the SDN environment. The blacklists may be supplied by the manager and may indicate one or more IP addresses that are not permitted to be bound to one or more logical ports. Additionally, the duplicate list or lists are built from addresses discovered by hypervisors in the SDN environment and may be used to ensure that the same IP address is not bound to multiple ports. As a result, when an IP address is obtained as part of a discovered list, controller 152 may determine whether the IP address is a duplicate of a binding for another logical port and determine which of the bindings should take precedence over another. In determining which of the bindings should take precedence over the other, controller 152 may select the binding with the earliest timestamp, the binding with the latest timestamp, the binding associated with a manual configuration from an administrator, or some other configuration.

Figure 4:
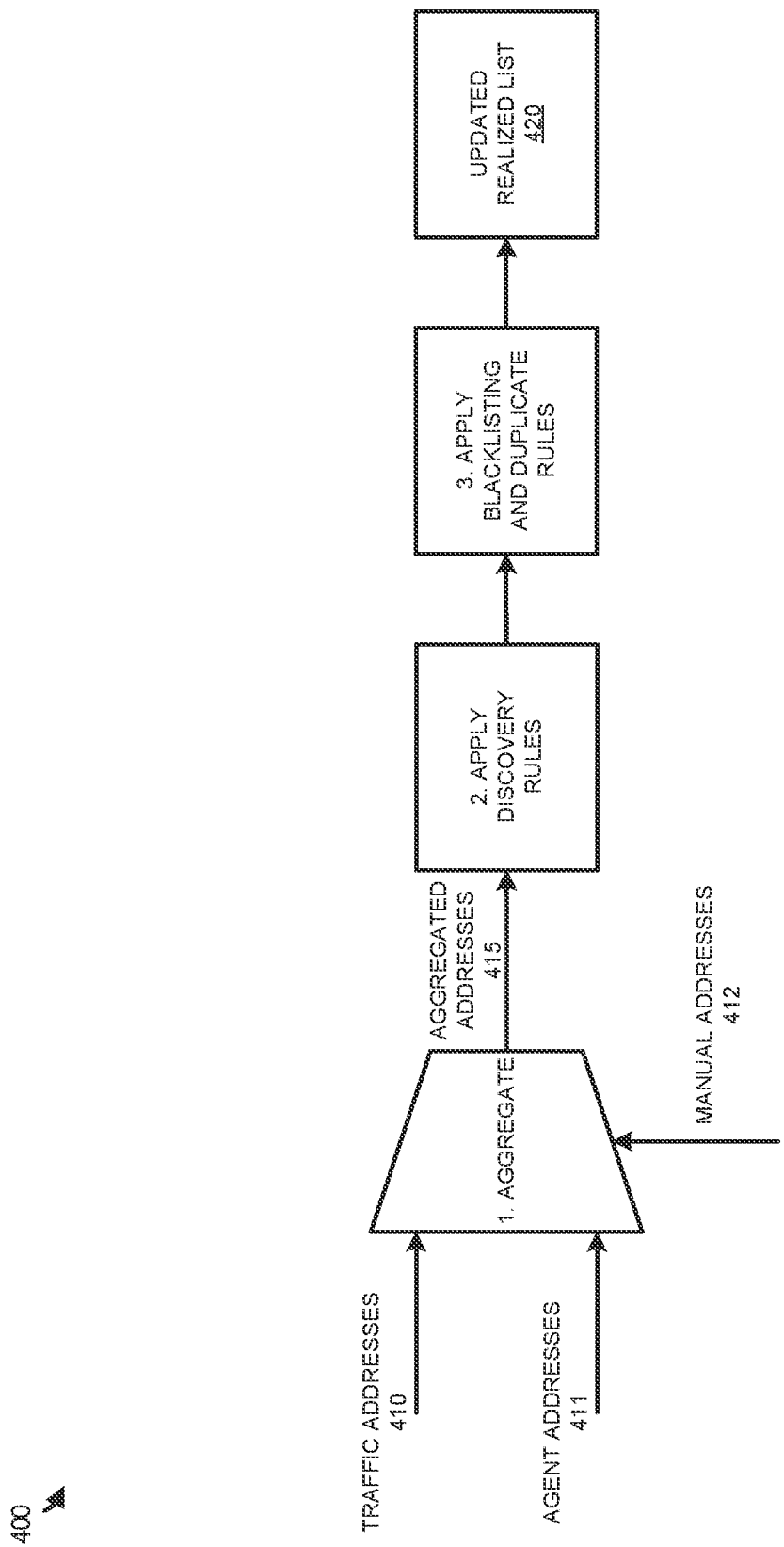
FIG. 4 illustrates an operational scenario of updating a realized list of IP addresses associated with at least one logical port according to an implementation.

FIG. 4 illustrates an operational scenario 400 of updating a realized list of IP addresses associated with at least one logical port according to an implementation. Operational scenario 400 includes traffic addresses 410, agent addresses 411, manual addresses 412, and aggregated addresses 415.

As described herein, a hypervisor may be used to discover addresses from multiple sources and aggregate the addresses to generate a discovered list. Here, the sources may be used to identify traffic addresses 410 corresponding to IP addresses identified in the data plane and agent addresses 411 corresponding to IP addresses identified from agents operating within virtual nodes of an SDN environment. When the hypervisor identifies the addresses, the hypervisor may aggregate, at step 1, traffic addresses 410 and agent addresses 411 into aggregated addresses 415 with consideration of manual addresses 412 that correspond to IP addresses bound to logical ports by administrator configurations. In some implementations, an administrator may generate an IP address discovery configuration that may include one or more manual IP address bindings to one or more logical ports. As a result, the hypervisor may be required to discover IP addresses that are different than manual addresses 412. In some examples, the hypervisor may identify addresses from multiple sources for a single logical port and generate a single common discovered list that includes all of the discovered addresses associated with the logical port.

Once aggregated addresses 415 are determined and provided to a control plane portion of the SDN environment, the control plane may apply, at step 2, discovery rules to aggregated addresses 415, wherein the discovery rules may include preferences or parameters associated with TOEU, TOFU, binding limits, or some other similar parameter. Additionally, the control plane may apply, at step 3 blacklisting and duplicate rules associated with one or more blacklists and duplicate address lists to generate updated realized list 420. In some implementations, steps 2 and 3, may be used to determine whether one or more IP addresses in aggregated addresses 415 should be added to a realized list associated with a logical port, whether an IP addresses existing in the realized list should be removed based on the newly discovered address, or whether some other operation should be taken with respect to a realized list associated with a logical port. The realized list may be indicative of addresses that are permitted to be bound to the port and that should be used in conjunction with forwarding rules, firewall rules, ARP suppression operations, or some other service provided by the control plane.

As an example, when a new address associated with a logical port is provided as part of aggregated addresses 415, the control plane may determine whether the IP address is permitted to be added to a realized list for the logical port based on an IP address discovery configuration provided by the management plane, wherein the discovery configuration may limit the number of bindings to a particular logical port, may provide timers to remove addresses from a realized list, or may provide some other configuration parameters. Additionally, the control plane may determine whether a match exists for the IP address in a blacklist for the logical port, wherein a match may prevent the IP address from being added to the realized list for the logical port. Further, the control plane may determine whether the IP address is a duplicate of an IP address discovered in association with another logical port. When a duplicate is identified, the control plane may determine which of the IP address bindings should be permitted based on the rules defined for the duplicate IP addresses. If, based on the discovery rules, the blacklisting rules, and the duplicate rules, it is determined that the discovered IP address is permitted, then the IP address may be added to the realized list of bindings supported by the logical port.

Figure 5:
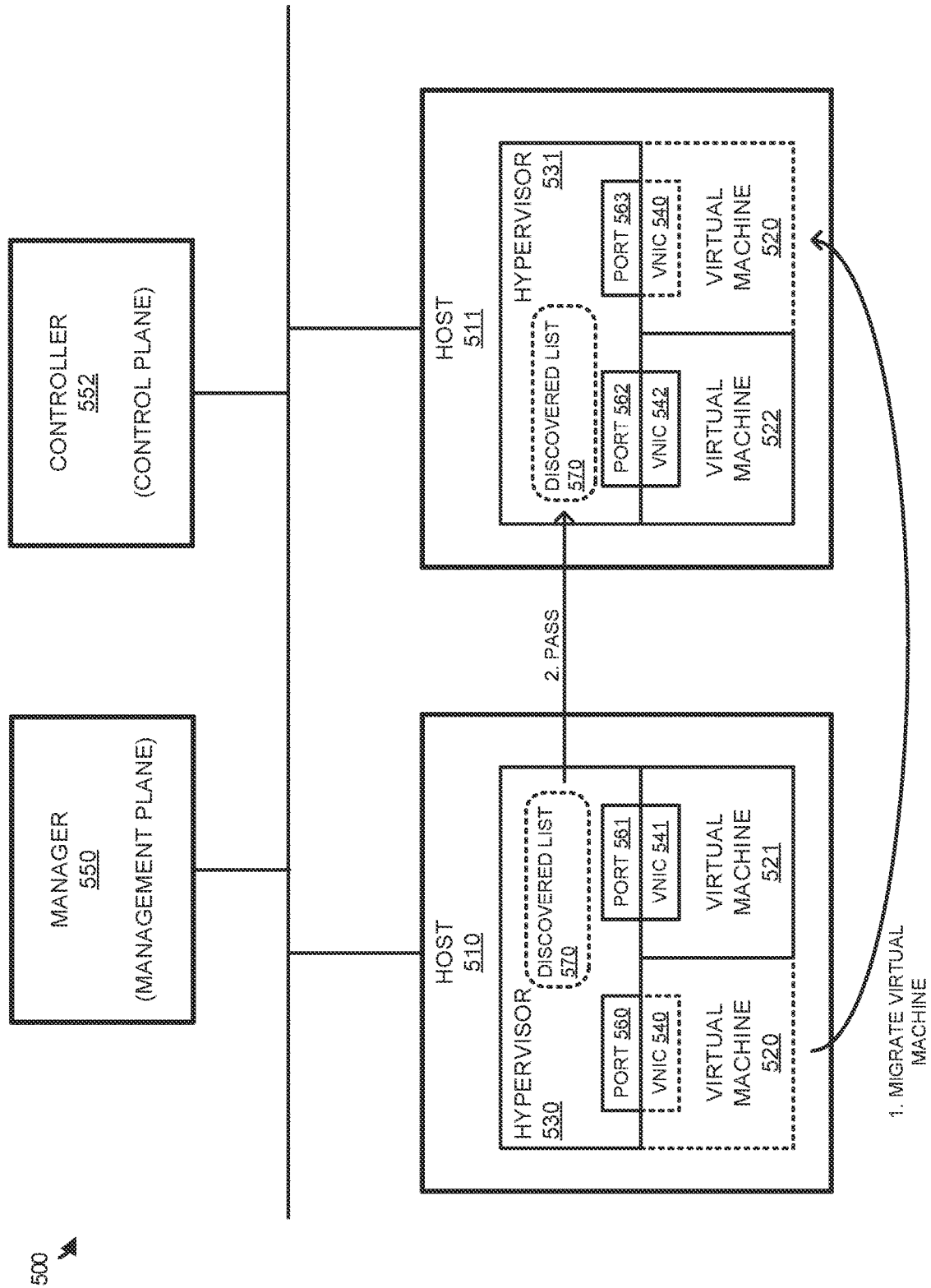
FIG. 5 illustrates an operational scenario of migrating a virtual machine between hosts according to an implementation.

FIG. 5 illustrates an operational scenario 500 of migrating a virtual machine between hosts according to an implementation. Operational scenario 550 includes manager 550, controller 552, and hosts 510-511. Hosts 510-511 include hypervisors 530-531, virtual nodes 520-522, VNICs 540-542, and logical ports 560-563.

In operation, hypervisors 530-531 may aggregate and maintain discovered addresses for virtual nodes from various sources, including discovery protocols and agents operating within the virtual nodes. The discovered lists may indicate a logical port, a VNIC identifier IP addresses associated with the port, the source of the discovered IP address, or other addressing information associated with the port and the corresponding VNIC. When a migration of a virtual machine is required from a host 510-511, the discovered list associated with the virtual machine may also be required to be communicated. Here, virtual machine 520 is migrated, at step 1, from host 510 to host 511, the virtual machine may be stopped on host 510 and the image initiated on host 511. Additionally, at step 2, hypervisor 530 may pass discovered list 570 associated with virtual machine 520 and VNIC 540 to hypervisor 531. This may permit hypervisor 531 to update the discovered list associated with new logical port 563 and update a realized list associated with logical port 563 using controller 552. In particular, while discovered list 570 may be used to update controller 552 regarding logical port 560, once virtual machine 520 is migrated, hypervisor 531 may be required to update controller 552 regarding logical port 563.

Figure 6:
FIG. 6 illustrates a data structure to manage IP address bindings to logical ports according to an implementation.

FIG. 6 illustrates a data structure 600 to manage IP address bindings to logical ports according to an implementation. Data structure 600 includes logical port column 610 with logical ports 611-613, IP address column 620 with IP addresses 621-623, IP address column 630 with IP addresses 631-633, and IP address column 640 with IP address 641. Although demonstrated as a table, it should be understood that a hypervisor or controller may maintain IP address binding information using a tree, linked list, or any other data structure.

In operation, a hypervisor may use a variety of sources to identify IP addresses associated with logical ports provided as part of an SDN environment. As the IP addresses are identified, the hypervisor may generate a discovered list or lists, which may be represented as a data structure, such as data structure 600. The discovered list may be passed to a controller, wherein the controller may determine any updates to realized lists associated with the one or more logical ports. For example, based on the discovered list information that corresponds to logical port 611, the controller may determine whether any updates should be implemented for the realized list associated with logical port 611 or any other logical ports in the SDN environment. In some implementations, the controller may consider at least an IP address discovery configuration, wherein the IP address discovery configuration may include binding limits for ports, TOEU or TOFU discovery rules, manual address configurations, timers, or some other parameter for discovered addresses.

In some implementations, the controller may further consider blacklists and/or duplicate lists to determine whether an address should be added. For example, if IP address 622 were part of a blacklist, IP address 622 may be prevented from being added to a realized list associated with a logical port. In another example, if IP address 632 were bound to another logical port, the controller may use rules associated with duplicate addresses to determine which realized list should be allocated the IP address. These rules may indicate that the earliest timestamp be allocated the binding, that any manual allocation by an administrator be allocated the binding, or some other rule.

Figure 7:
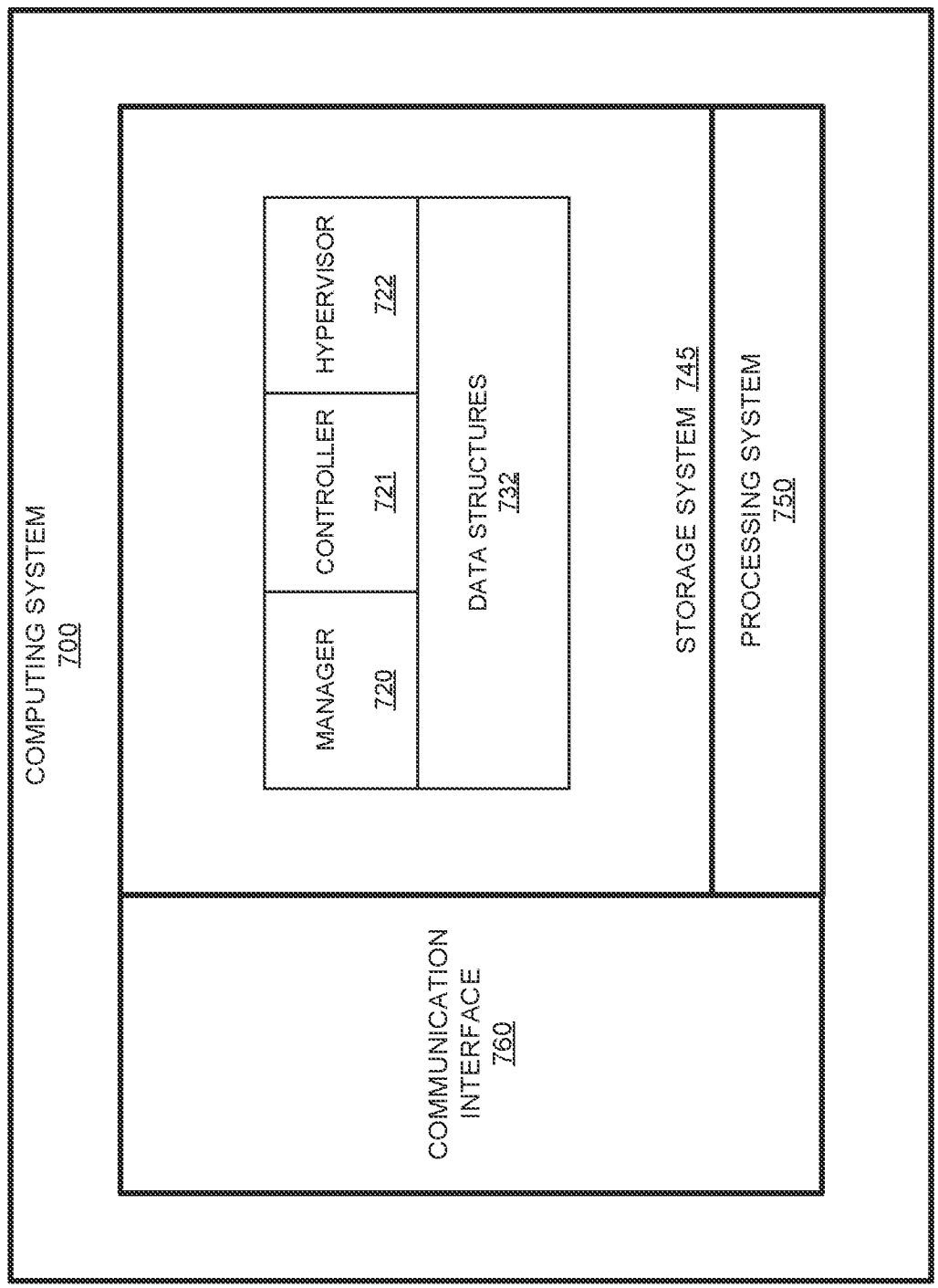
FIG. 7 illustrates a computing system to provide at least control and data plane services according to an implementation.

FIG. 7 illustrates a computing system 700 to provide at least control and data plane services according to an implementation. Computing system 700 is representative of any computing system or systems with which the various operational architectures, processes, scenarios, and sequences disclosed herein for a computing system can be implemented. Computing system 700 includes storage system 745, processing system 750, and communication interface 760. Processing system 750 is operatively linked to communication interface 760 and storage system 745. Communication interface 760 may be communicatively linked to storage system 745 in some implementations. Computing system 700 may further include other components such as a battery and enclosure that are not shown for clarity.

Communication interface 760 comprises components that communicate over communication links, such as network cards, ports, radio frequency (RF), processing circuitry and software, or some other communication devices. Communication interface 760 may be configured to communicate over metallic, wireless, or optical links. Communication interface 760 may be configured to use Time Division Multiplex (TDM), Internet Protocol (IP), Ethernet, optical networking, wireless protocols, communication signaling, or some other communication format—including combinations thereof. Communication interface 760 is an example of a physical network interface that can be configured to communicate with other computing systems to provide required operations for the processes executing on computing system 700. In at least one example, communication interface 760 may communicate with other host computing systems or some other computing system.

Processing system 750 comprises microprocessor and other circuitry that retrieves and executes operating software from storage system 745. Storage system 745 may include volatile and nonvolatile, removable and non-removable media implemented in any method or technology for storage of information, such as computer readable instructions, data structures, program modules, or other data. Storage system 745 may be implemented as a single storage device but may also be implemented across multiple storage devices or sub-systems. Storage system 745 may comprise additional elements, such as a controller to read operating software from the storage systems. Examples of storage media include random access memory, read only memory, magnetic disks, optical disks, and flash memory, as well as any combination or variation thereof, or any other type of storage media. In some implementations, the storage media may be a non-transitory storage media. In some instances, at least a portion of the storage media may be transitory. It should be understood that in no case is the storage media a propagated signal.

Processing system 750 is typically mounted on a circuit board that may also hold the storage system. The operating software of storage system 745 comprises computer programs, firmware, or some other form of machine-readable program instructions. The operating software of storage system 745 comprises manager 720, controller 721, and hypervisor 722. The operating software on storage system 745 may further include utilities, drivers, network interfaces, applications, or some other type of software. When read and executed by processing system 750, the operating software on storage system 745 directs computing system 700 to operate as described herein.

In at least one implementation, manager 720 directs processing system 750 to generate an IP address discovery configuration and pass the discovery configuration to controller 721. Controller 721 directs processing system 750 to obtain a discovered list from hypervisor 722 of one or more IP addresses associated with one or more logical ports, wherein the discovered list comprises an aggregated address list from two or more sources. Once the discovered list is obtained, controller 721 directs processing system 750 to update one or more realized lists for the one or more logical ports based on the discovered list and the IP address discovery configuration. The realized lists may include address bindings that are permitted for the SDN environment, whereas the discovered list may include addresses that are bother permitted and unpermitted. For example, a discovery configuration may limit the quantity of bindings associated with each logical port. As a result, if an IP address is identified that exceeds the bindings limit for a logical port, controller 721 may select an IP address that should be included as part of the realized list.

In some implementations, hypervisor 722 may discover IP addresses associated with logical ports using a variety of different sources, wherein the sources may include traffic protocols associated with address discovery or agents executing locally inside the virtual nodes. As the addresses are discovered for a corresponding logical switch, hypervisor 722 may aggregate or combine the addresses into a single discovered list that can be provided to controller 721. Thus, regardless of the source of the IP address, hypervisor 722 may provide a single combined list for a logical port that demonstrates all of the addresses associated with the logical port.

In some examples, controller 721 may consider more than the IP discovery configuration provided by manager 720 in determining how to update the realized list or lists associated with logical ports. In particular, controller 721 may consider blacklists and/or duplicate lists, wherein the blacklists correspond to IP addresses that are not permitted to be bound to one or more logical ports and wherein the duplicate lists may correspond to addresses already bound to other logical ports in the SDN environment. When a new IP address is provided as part of a discovered list from hypervisor 722, controller 721 may consider the IP discovery configuration, addresses permitted based on blacklists, and lists of addresses already bound to other logical ports to determine the updates (if required) to the one or more realized lists. The update may include adding the address to a realized list associated with a logical port, removing the address from a realized list associated with a logical port, or providing some other operation with respect to the realized lists.

Although illustrated on the same host computing system as hypervisor 722 in the example of FIG. 7, it should be understood that manager 720 may reside on a separate computing system from hypervisor 722. Additionally, while controller 721 is demonstrated on computing system 700 with hypervisor 722, it should be understood that controller 721 may be implemented as a distributed process across multiple computing systems or may reside on a separate computing system.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of managing Internet Protocol (IP) address discovery in a software defined network (SDN) environment, the method comprising:
   in a control plane, receiving an IP address discovery configuration from a management plane;
   in the control plane, obtaining a discovered list from a hypervisor of one or more IP addresses associated with one or more logical ports, wherein the one or more IP addresses correspond to one or more overlay network addresses associated with one or more virtual nodes coupled to the one or more logical ports; and
   in the control plane, updating one or more realized lists for the one or more logical ports based on the discovered list and the IP address discovery configuration.

2. The method of claim 1 further comprising:
   in the management plane:
     generating an IP address discovery configuration; and
     passing the IP address discovery configuration to the control plane.

3. The method of claim 1 further comprising:
   in the hypervisor, discovering a first set of one or more IP addresses associated with the one or more logical ports based on data traffic for the one or more logical ports;
   in the hypervisor, aggregating the first set of one or more IP addresses into the discovered list for the one or more logical ports; and
   in the hypervisor, passing the discovered list to the control plane.

4. The method of claim 3, wherein the data traffic comprises Address Resolution Protocol (ARP) traffic, Dynamic Host Configuration Protocol (DHCP) traffic, or Neighbor Discovery Protocol traffic.

5. The method of claim 3, wherein discovering the first set of one or more IP addresses associated with the one or more logical ports is further based on addressing information provided by one or more agents in virtual nodes coupled to the one or more logical ports.

6. The method of claim 1, wherein the IP address discovery configuration comprises at least security controls associated with limiting IP address bindings to logical ports in the SDN environment.

7. The method of claim 6, wherein the security controls comprise parameters for Trust on Every Use (TOEU), Trust on First Use (TOFU), and/or IP binding limits for the logical ports.

8. The method of claim 1, wherein the IP address discovery configuration comprises at least security controls associated with limiting IP address bindings to logical ports in the SDN environment.

9. The method of claim 1, wherein the IP address discovery configuration indicates whether any manual IP address bindings take precedence over discovered IP address bindings.

10. The method of claim 1, wherein updating one or more realized lists for the one or more logical ports is further based on one or more blacklists or one or more duplicate address lists.

11. A computing apparatus comprising:
    a storage system;
    a processing system operatively coupled to the storage system; and
    program instructions stored on the storage system to manage Internet Protocol (IP) address discovery in a software defined network (SDN) environment that, when executed by the processing system, direct the computing apparatus to:
      in a control plane, receive an IP address discovery configuration from a management plane;
      in the control plane, obtain a discovered list from a hypervisor of one or more IP addresses associated with one or more logical ports, wherein the one or more IP addresses correspond to one or more overlay network addresses associated with one or more virtual nodes coupled to the one or more logical ports; and
      in the control plane, update one or more realized lists for the one or more logical ports based on the discovered list and the IP address discovery configuration.

12. The computing apparatus of claim 11, wherein the program instructions further direct the computing apparatus to:
    in management plane:
      generate an IP address discovery configuration; and
      pass the IP address discovery configuration to the control plane.

13. The computing apparatus of claim 11, wherein the program instructions further direct the computing apparatus to:
    in the hypervisor, discover a first set of one or more IP addresses associated with the one or more logical ports based on data traffic for the one or more logical ports;
    in the hypervisor, aggregate the first set of one or more IP addresses into the discovered list for the one or more logical ports; and
    in the hypervisor, pass the discovered list to the control plane.

14. The computing apparatus of claim 13, wherein the data traffic comprises Address Resolution Protocol (ARP) traffic, Dynamic Host Configuration Protocol (DHCP) traffic, or Neighbor Discovery Protocol traffic.

15. The computing apparatus of claim 13, wherein discovering the first set of one or more IP addresses associated with the one or more logical ports is further based on addressing information provided by one or more agents in virtual nodes coupled to the one or more logical ports.

16. The computing apparatus of claim 11, wherein the IP address discovery configuration comprises at least security controls associated with limiting IP address bindings to logical ports in the SDN environment.

17. The computing apparatus of claim 16, wherein the security controls comprise parameters for Trust on Every Use (TOEU), Trust on First Use (TOFU), and/or IP binding limits for the logical ports.

18. The computing apparatus of claim 11, wherein the IP address discovery configuration comprises at least security controls associated with limiting IP address bindings to logical ports in the SDN environment.

19. The computing apparatus of claim 11, wherein the IP address discovery configuration indicates whether any manual IP address bindings take precedence over discovered IP address bindings.

20. The computing apparatus of claim 11, wherein updating one or more realized lists for the one or more logical ports is further based on one or more blacklists or one or more duplicate address lists.

* * * * *